United States Patent Office.

CARL DUISBERG, OF ELBERFELD, GERMANY, ASSIGNOR TO THE FARBENFABRIKEN, VORMALS FR. BAYER & CO., OF SAME PLACE.

BLUE DYE.

SPECIFICATION forming part of Letters Patent No. 432,989, dated July 29, 1890.

Application filed August 19, 1889. Serial No. 321,304. (Specimens.) Patented in Germany December 5, 1883, No. 27,954, and in England January 9, 1884, No. 1,099.

*To all whom it may concern:*

Be it known that I, CARL DUISBERG, doctor of philosophy, chemist, and assignor to the FARBENFABRIKEN, VORMALS FR. BAYER & CO., in Elberfeld, a subject of the Emperor of Germany, residing at Elberfeld, Germany, have invented a new and useful Improvement in the Manufacture of a New Blue Coloring-Matter, (for which the Farbenfabriken, vormals Fr. Bayer & Co., have obtained Letters Patent in Germany, dated December 5, 1883, No. 27,954, and in Great Britain, dated January 9, 1884, No. 1,099,) of which I give in the following a clear and exact description.

My invention relates to the manufacture of a new blue coloring-matter for dyeing cotton, wool, and silk by the action of tetrazo-diphenyl sulphone disulpho-acid upon phenyl beta-naphthylamine.

The benzidine sulphone disulpho-acid which is necessary for my dye-stuff is manufactured, as is described in the above-mentioned Letters Patent, by the sulphuration of benzidine sulphate with fuming sulphuric acid. I proceed as follows: One part of benzidine sulphate is gradually added to four or five parts, by weight, of fuming sulphuric acid of forty per cent. anhydride. The temperature of the melt rises to 80° centigrade, and the benzidine sulphate is changed into the benzidine sulphone. For converting the same into the desired disulpho-acid the melt is heated for some hours to about 160° centigrade till a sample clearly dissolves in alkaline water and no precipitate separates by the addition of acetic acid, which would prove for benzidine sulphone monosulpho-acid. The melt is poured on ice, the insoluble disulpho-acid filtered off, and the soda salt formed. This is difficultly soluble in cold water, easily in hot water, and crystallizes in fine yellow needles. The free benzidine sulphone disulpho-acid itself is difficultly soluble in cold water, easily in hot water, and is a yellowish powder, forming an insoluble white tetrazo compound.

In order to manufacture my new dye-stuff from this benzidine sulphone disulpho-acid with phenyl beta-naphthylamine, I proceed as follows: Thirty-one kilos of the sodium salt of benzidine sulphone disulpho-acid are dissolved in water cooled by ice, acidulated with hydrochloric acid, and ten kilos of sodium nitrite are slowly added. After standing for some hours the formed tetrazo compound is filtered off and under continuous stirring added to a solution of thirty kilos phenyl beta-naphthylamine and three kilos of acetate of soda, dissolved in three hundred kilos of alcohol. The solution turns immediately, becomes colored deep blue, and the dye-stuff is formed after some time and after heating formed. By adding water the dye-stuff acid precipitates. In order to convert this acid into the dye-stuff, the same is filtered off and treated with a diluted solution of sodium carbonate. The formed dye-stuff, which is insoluble in cold water, is filtered off and dried. In this way a dye-stuff of the following composition is obtained:

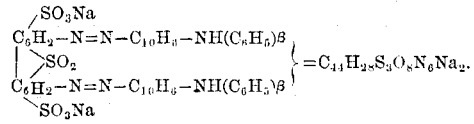

It forms in the dry state an indigo-blue amorphous powder, which is difficultly soluble in cold water, easily, however, in hot water and alcohol with a fine blue color, insoluble in benzine.

In concentrated sulphuric acid the dye-stuff is dissolved with a red-violet shade.

By adding mineral acids to a watery solution the dye-stuff acid is precipitated as a blue precipitate. It dyes unmordanted cotton in an alkaline bath and wool and silk in neutral bath in a beautiful indigo-blue shade.

Having thus described my invention, what I claim as new, and desire to secure by Letters Patent, is—

The coloring-matter herein described, which is produced by the action of the tetrazo compound of the above-described benzidine sulphone disulpho-acid upon phenyl beta-naphthylamine and which is in dry state an indigo-blue amorphous powder, difficultly soluble in cold water, easily in hot water and alcohol, insoluble in benzine, and which is dissolved in concentrated sulphuric acid with a red-violet color, it dyes unmordanted cotton in alkaline bath and wool and silk in a neutral bath with a fine indigo-blue shade, substantially as hereinbefore described.

In testimony whereof I have signed my name in presence of two subscribing witnesses.

CARL DUISBERG.

Witnesses:
RICHARD LANDY,
PHILIPP OTT.